UNITED STATES PATENT OFFICE.

CHARLES J. EVERETT, OF TENAFLY, NEW JERSEY.

CEMENT COMPOUND.

SPECIFICATION forming part of Letters Patent No. 515,757, dated March 6, 1894.

Application filed February 7, 1891. Serial No. 380,620. (No specimens.)

*To all whom it may concern:*

Be it known that I, CHARLES J. EVERETT, of Tenafly, in the county of Bergen and State of New Jersey, have invented a new and useful Improvement in Cement Compounds, of which the following is a specification.

This invention is the result of experiments by which I have made the discovery that the addition of chloride of calcium to hydraulic cements of which Portland and Rosendale are examples, are productive of a very important improvement in the quality of such cements.

The said invention which is based upon the above mentioned discovery therefore consists in a new cement compound composed of hydraulic cement and chloride of calcium.

My experiments have led to the further discovery that said compound of hydraulic cement and chloride of calcium is further improved by the addition of lime, and my invention therefore consists also in a cement compound composed of hydraulic cement, lime and chloride of calcium. The effects of the addition of chloride of calcium to the various hydraulic cements vary somewhat with the different kinds of cement. In general it may be stated that the chloride of calcium renders the cement mortar more plastic and susceptible of finer impressions in taking casts from molds and that in most cases it hastens the setting of cements without injury to them which is an important result to the work done on public thoroughfares, in damp cellars and in cold weather. The chloride of calcium also renders any indurated cement decidedly harder and tougher, and I have also found that it has the valuable property of preventing the plastic mortar of cements from freezing in very cold weather, so that such mortar can be laid safely at temperatures much below the freezing point.

A concentrated solution of chloride of calcium will dissolve a sensible quantity of lime say one to two per cent. and will gelatinize a much larger proportion; hence in those hydraulic cements which are deficient in lime, the latter ingredient may be introduced when the cement mortar is mixed, in the form most suitable for chemical combination, by first dissolving it in a solution of chloride of calcium.

In carrying out my invention I commonly use the chloride of calcium in solution in water. The solution may be applied to the hydraulic cements in various ways; for instance, (first) it may be used instead of clear water for wetting up the cement to make the mortar or (second) it may be applied to the surface of the soft plastic mortar, after the latter has been laid in place as for pavements, or (third) it may be used as a bath for indurated objects or masses of mortar.

In general I have found that the strongest and highest grades of cement will bear the strongest dose of chloride of calcium and that for the inferior cements the strength of the solution must be reduced. This rule applies to cases where the solution is mixed directly with the plastic mortar, and not to surface treatment of indurated mortar. I find it necessary to test each different variety of cement with the solution to determine the strength of the solution it will bear. My standard solution of chloride of calcium for summer use is about 45° Baumé and for winter use about 35° Baumé. With some of the strongest German Portland cements I have attained the best results by using my standard solution without dilution, either for mixing the mortar or for surface treatment. With weaker Portland cements I have used the same solution diluted with from one to three parts in volume of water. In treating the different so-called "Rosendale" cements it is generally safer to mix the dry cement with water and let the mortar thoroughly set, and then apply my strong solution to the surface until no more is absorbed. The surface is thus rendered very much harder. To prevent freezing in cold weather, the solution of 35° Baumé may be diluted with twice its volume of water and thus prepared, used to wet the cement.

What I claim as my invention, and desire to secure by Letters Patent, is—

1. A cement compound composed of a cement which is itself hydraulic and chloride of calcium, substantially as herein set forth.

2. A cement compound composed of a cement which is itself hydraulic, chloride of calcium and lime, substantially as herein set forth.

CHARLES J. EVERETT.

Witnesses:
FREDK. HAYNES,
L. M. EGBERT.